(12) United States Patent
Vandrak

(10) Patent No.: US 8,490,639 B2
(45) Date of Patent: Jul. 23, 2013

(54) TEMPERATURE SENSITIVE VALVE

(75) Inventor: Brian J. Vandrak, Highland Heights, OH (US)

(73) Assignee: Enerco Group, Inc., Cleveland, OH (US)

( * ) Notice: Subject to any disclaimer, the term of this patent is extended or adjusted under 35 U.S.C. 154(b) by 330 days.

(21) Appl. No.: 12/952,460

(22) Filed: Nov. 23, 2010

(65) Prior Publication Data

US 2011/0290345 A1    Dec. 1, 2011

Related U.S. Application Data

(60) Provisional application No. 61/263,944, filed on Nov. 24, 2009.

(51) Int. Cl.
*F16K 17/40* (2006.01)

(52) U.S. Cl.
USPC .................................. 137/75; 137/72; 137/79

(58) Field of Classification Search
USPC ............ 137/79, 75, 72, 67; 251/66; 220/89.1, 220/89.4
See application file for complete search history.

(56) References Cited

U.S. PATENT DOCUMENTS

| | | | | | |
|---|---|---|---|---|---|
| 2,817,349 | A | * | 12/1957 | Seaver | 137/75 |
| 3,456,722 | A | * | 7/1969 | Cornelius | 166/64 |
| 3,782,681 | A | * | 1/1974 | Blackstein | 251/11 |
| 3,862,641 | A | * | 1/1975 | Follett | 137/75 |
| 4,974,623 | A | * | 12/1990 | Sturgis | 137/74 |
| 5,027,845 | A | * | 7/1991 | Silagy | 137/74 |
| 5,562,118 | A | * | 10/1996 | Cross | 137/77 |
| 5,787,918 | A | * | 8/1998 | Jensen | 137/75 |
| 6,769,448 | B1 | * | 8/2004 | Williams | 137/75 |
| 7,150,287 | B2 | * | 12/2006 | Kita et al. | 137/72 |
| 7,387,134 | B2 | * | 6/2008 | Moore et al. | 137/74 |

* cited by examiner

*Primary Examiner* — John Rivell
*Assistant Examiner* — Umashankar Venkatesan
(74) *Attorney, Agent, or Firm* — Brouse McDowell; Heather M. Barnes; Michael G. Craig

(57) ABSTRACT

Provided is a temperature-sensitive fluid flow interruption device for use in operational connection with a normally-closed poppet openable by overcoming a closure force. The device may comprise an elongated housing, an elongated displacement member, a spring, and a retention cap. An elongated housing may comprise an elongated first channel. An elongated displacement member may be engaged with said elongated first channel and may comprise a longitudinal axis, a first spring retention surface, and a poppet engageable end. The poppet engageable end may be adapted for engagement with said poppet and may be engaged with the housing in a manner determined by the temperature of the temperature-sensitive fluid flow interruption device with respect to a pre-determined temperature. A spring may be engaged with the first retention surface. A retention cap may be engaged with the housing and may comprise a second retention surface engaged with the spring.

14 Claims, 4 Drawing Sheets

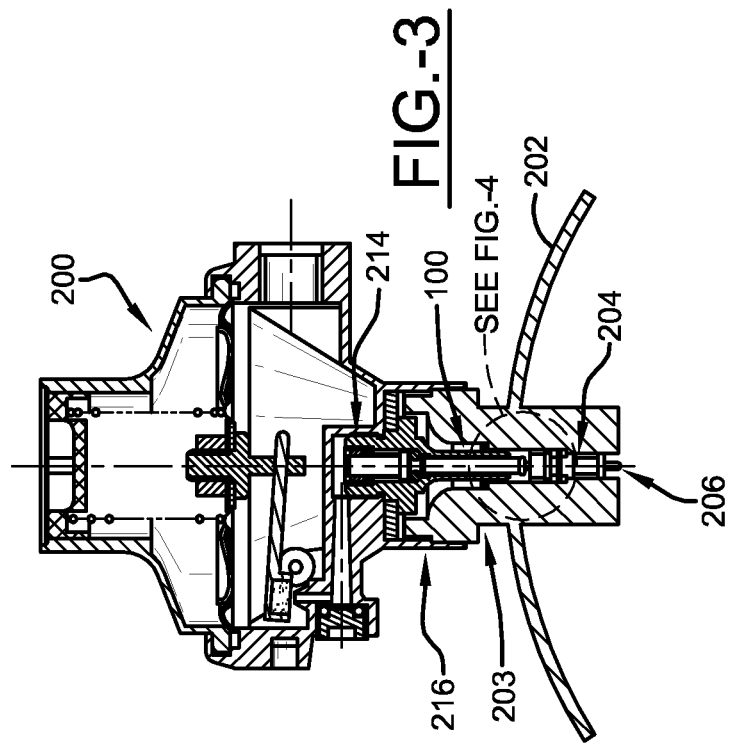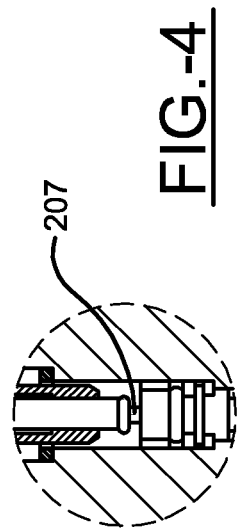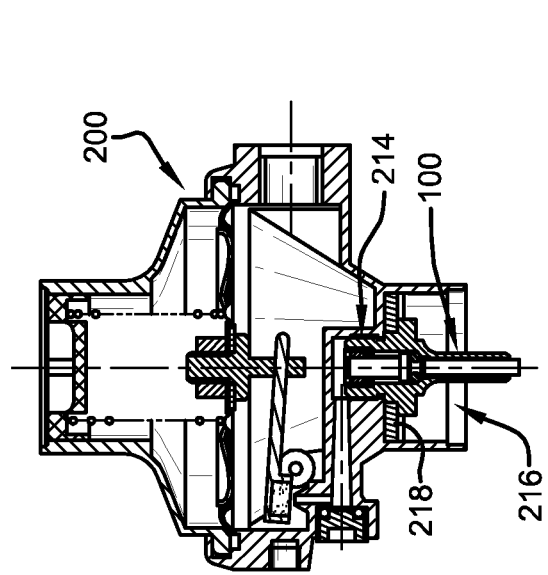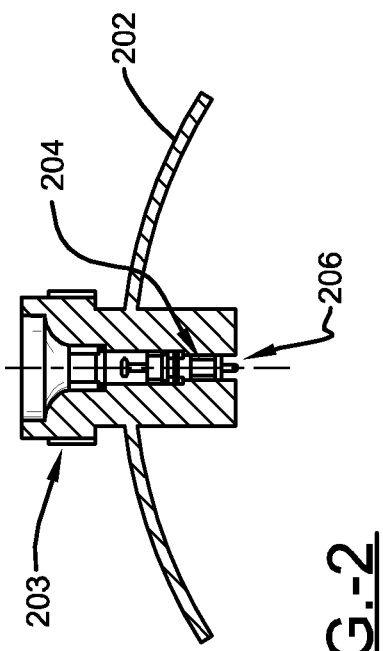

TEMPERATURE SENSITIVE VALVE

CROSS-REFERENCE TO RELATED APPLICATION

This application claims the benefit of U.S. Provisional Application No. 61/263,944, filed on Nov. 24, 2009. All of the subject matter disclosed by U.S. Provisional Application No. 61/263,944 is hereby incorporated by reference into this application.

TECHNICAL FIELD

Provided is a device for interruption of gas flow. More particularly, provided is device for interruption of a gas flow in gas-supplied devices exposed to elevated temperatures. Also provided is a device for interruption of a fuel gas flow in a device exposed to temperatures elevated above a predetermined temperature.

BACKGROUND

Some combustion powered devices receive a flow of fuel during operation. In some devices, the fuel flows from a fuel storage container. In the event of an exposure of the device to temperatures above a pre-determined temperature, the continued supply of fuel from a fuel storage container may be undesirable. In many applications, in the event that a device in fluid connection to a gas bottle is exposed to temperatures that are outside of the safe operating temperature range or are otherwise are undesirably high, it may be desirable to provide means to automatically interrupt gas flow from the gas bottle to the device.

It remains desirable to provide automation adapted for the interruption of a gas flow to a supplied device that is exposed to temperatures above a pre-determined temperature.

SUMMARY

Provided is a temperature-sensitive fluid flow interruption device for use in operational connection with a poppet valve. A poppet valve may comprise a normally-closed poppet that may be held open by overcoming a closure force. The temperature sensitive fluid flow interruption device may comprise an elongated housing, an elongated displacement member, a spring, and a retention cap. An elongated housing may comprise an elongated first channel. An elongated displacement member may be engaged with said elongated first channel. The elongated displacement member may comprise a longitudinal axis, a first spring retention surface, and a poppet engageable end. The poppet engageable end may be adapted for engagement with said poppet. The poppet engageable end may be engaged with the housing in a manner determined by the temperature of the temperature-sensitive fluid flow interruption device with respect to a predetermined temperature: when the temperature of the temperature-sensitive fluid flow interruption device is below the predetermined temperature, the poppet engageable end can hold open the poppet valve; and when the temperature of the temperature-sensitive fluid flow interruption device is at or above the predetermined temperature, the poppet engageable end allows the poppet valve to close. A spring may be removably and operatively engaged with the first retention surface. A retention cap may be removably engaged with the housing. A retention cap may comprise a second retention surface substantially facing into the elongated first channel and may be removably and operatively engaged with the spring.

Also provided is a temperature-sensitive fluid flow interruption device adapted for use in operational connection with a Schrader valve wherein said Schrader valve may be adapted for operational connection to a gas bottle and wherein the temperature sensitive fluid flow interruption device may comprise a housing, an elongated displacement member, a retention cap, and a spring. The housing may comprise an elongated first channel. The elongated displacement member may be engaged with the elongated first channel. The elongated displacement member may comprise a longitudinal axis and a first spring retention surface. The elongated displacement member may be engaged with the elongated first channel in a manner determined by the temperature of the temperature-sensitive fluid flow interruption device with respect to a predetermined temperature. When the temperature of the temperature-sensitive fluid flow interruption device is below the predetermined temperature, the displacement member may be engaged with the elongated first channel in a manner adapted to open the valve. When the temperature of the temperature-sensitive fluid flow interruption device is above the predetermined temperature, the displacement member may be engaged with the elongated first channel in a manner adapted to permit the valve to close. The retention cap may be engaged with the elongated first channel. The retention cap may comprise a retention cap spring retention surface. The spring may be removably and operatively engaged with the first spring retention surface and may be removably and operatively engaged with the retention cap spring retention surface.

Also provided is a temperature-sensitive fluid flow interruption device adapted for use in operational connection with a Schrader valve, said Schrader valve operationally connected to a propane bottle, the temperature sensitive fluid flow interruption device being adapted for re-use after functioning to interrupt of fluid flow, the temperature sensitive fluid flow interruption device may comprise a housing, an elongated displacement member, a substantially cylindrical retention cap, a spring, and an O-ring. A housing may comprise an elongated substantially cylindrical body, connection elements, an elongated first channel through the body, an abutment surface, and a tool interface surface. The connection element may comprise male threads operative connected to the exterior of the body and may be adapted for engagement with a regulator. The elongated first channel may comprise a longitudinal axis, a first substantially cylindrical cavity of a first diameter, a second substantially cylindrical cavity of a second diameter, and a surface having a facing having an axial component between said first substantially cylindrical cavity and said second substantially cylindrical cavity. The second diameter may be greater than said first diameter. The second substantially cylindrical cavity may comprise a retention cap engagement region comprising female engagement threads. The abutment surface may be adapted for contact with a facing surface of a regulator. The tool interface surface may comprise a pentagonal or triangular surface. The elongated displacement member may be at least partially positioned within the elongated first channel. The elongated displacement member may comprise a longitudinal axis, an elongated, substantially cylindrical, linear low density polyethylene body, and a flange. The elongated, substantially cylindrical, linear low density polyethylene body may comprise a valve stem engageable end, a second end opposite said valve stem engageable end, and an O-ring retention geometry. The valve stem engageable end may be adapted for engagement with a valve stem and may be fixedly engaged with the elongated displacement member. The elongated displacement member may be engaged with the elongated first channel in a manner determined by the temperature of the temperature-sensitive fluid flow interruption device with respect to a predetermined temperature. When the temperature of the temperature-sensitive fluid flow interruption device is below the predetermined temperature, the displacement member is engaged with the elongated first channel in a manner adapted to transmit forces greater than the closure force without substantial displacement of the displacement member with respect to the elongated first channel. When the temperature of the temperature-sensitive fluid flow interruption device is above the predetermined temperature, the displacement member is engaged with the elongated first channel in a manner adapted to permit substantial displacement of the displacement member with respect to the elongated first channel in response to forces greater than the closure force. The flange may be engaged with the lateral surface of the elongated substantially cylindrical body. The flange may comprise a first retention surface having a facing having an axial component. The substantially cylindrical retention cap may comprise male threads engaged with the lateral surface of said retention cap. The retention cap may be threadedly engaged with a retention cap engagement region. The retention cap may comprise a retention cap spring retention surface. The retention cap may comprise a tool interface region adapted for use with tools adapted for use with security fasteners. The retention cap may comprise a hole adapted to permit axial insertion and passage therethrough of the second end of the elongated displacement member. The spring may comprise a compression coil spring. The spring may be removably and operatively engaged with the first retention surface. The spring may be removably and operatively engaged with said retention cap spring retention surface.

BRIEF DESCRIPTION OF THE DRAWINGS

FIG. 2 is a sectional view of one embodiment of a temperature-sensitive fluid flow interruption device in conjunction with a regulator shown in position prior to connection with a gas bottle.

FIG. 3 is a sectional view of one embodiment of a temperature-sensitive fluid flow interruption device in conjunction with a regulator shown in connection with a gas bottle.

FIG. 4 is a detail view of the sectional view of FIG. 3 showing the details of the connection region.

DETAILED DESCRIPTION

Figure 1:
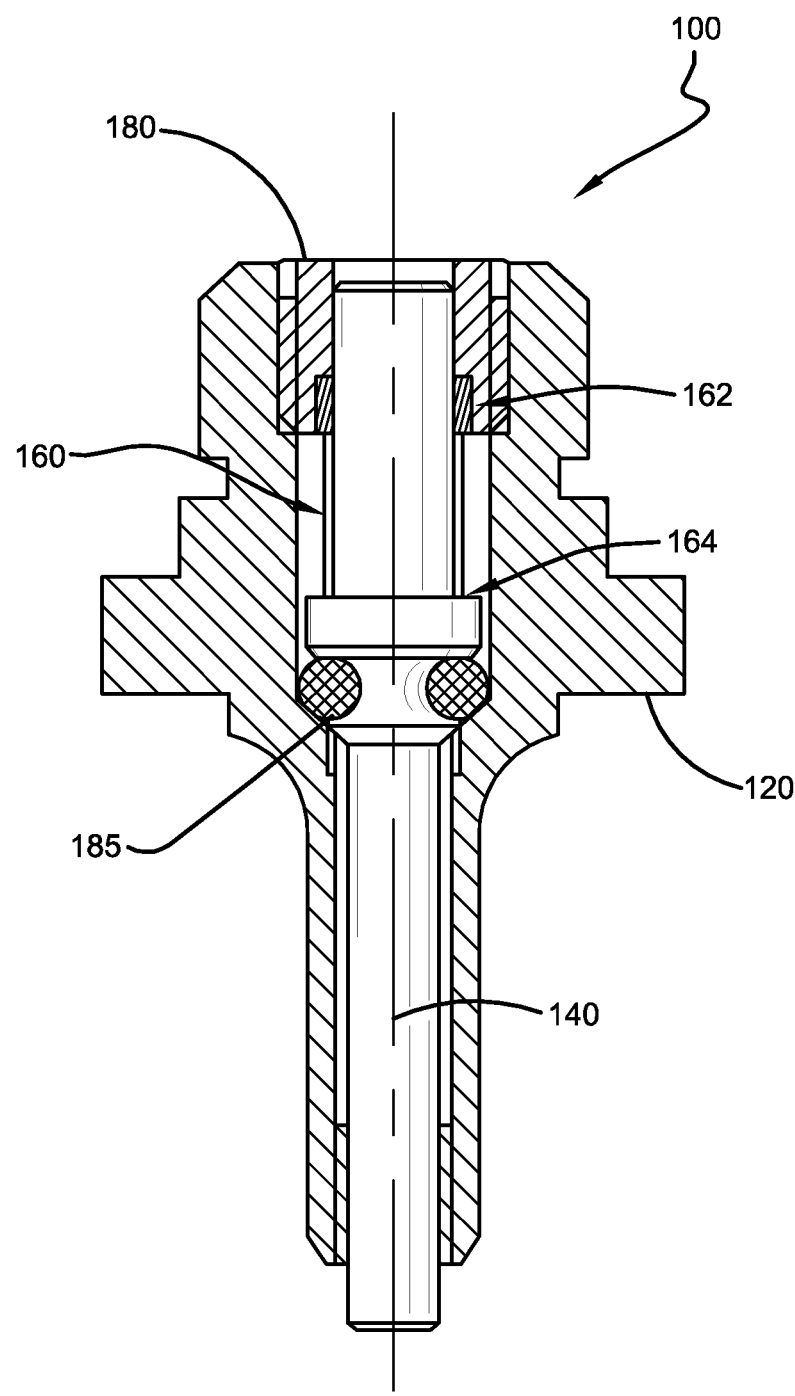
FIG. 1 is a sectional view of one embodiment of a temperature-sensitive fluid flow interruption device.
Figure 5:
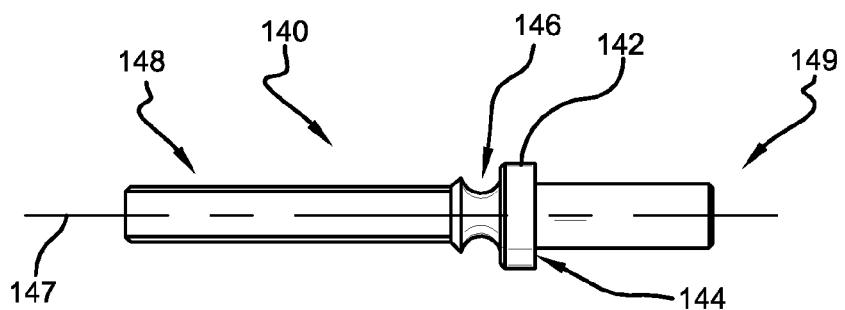
FIG. 5 is a front orthogonal view of one embodiment of a displacement member.

Reference will be made to the drawings, FIGS. 1-11, wherein the showings are only for purposes of illustrating certain embodiments of a temperature-sensitive fluid flow interruption device, and not for purposes of limiting the same. Specific physical characteristics relating to the embodiments disclosed herein are not to be considered as limiting, unless the claims expressly state otherwise.

As used herein, lateral surface refers to the part of the surface of a cylinder between of the ends of the cylinder.

FIGS. 1-11 show an embodiment of a pressure regulator 200 comprising a temperature-sensitive fluid flow interruption device 100. Pressure regulator 200 may comprise an inlet port 210 adapted for fluid communication with a gas bottle 202. A gas bottle will be referred to herein as a "bottle", and may comprise a bottle, tank, reservoir, or other container adapted for holding gaseous or fluid material. Without limitation, gas bottle 202 may be a bottle for, or a bottle adapted to contain, or a bottle containing, propane, propene, MAPP gas, methylacetylene-propadiene, oxygen, nitrous oxide, natural gas, methane, ethane, butane, liquid petroleum gas, hydrogen, HCNG, helium, neon, argon, nitrogen, carbon dioxide, any other gas, or mixtures thereof. In certain embodiments a pressure regulator 200 may comprise an opening 214 adapted for a fluid communicative connection with a temperature-sensitive fluid flow interruption device 100. A pressure regulator 200 may comprise an opening 216 adapted for a fluid communicative connection with a gas bottle 202. Openings 214 and 216 are substantially fixed in relationship to one another such that a temperature-sensitive fluid flow interruption device 100 and a gas bottle 202 connected thereto may be positively located with respect to one another. In certain embodiments, and without limitation, openings 214 or 216 may comprise female threads, male threads, clamping regions, or other fluid communicative connection elements. In the embodiment shown in FIGS. 2-3, the temperature-sensitive fluid flow interruption device 100 is connectable to opening 214 to form a fluid communicative connection therebetween.

In the embodiments shown in FIG. 1-11, the gas bottle 202 may comprise a connector 203 adapted for fluid communicative connection to opening 216 of pressure regulator 200. In certain embodiments, and without limitation, connector 203 may comprise female threads, male threads, clamping regions, or other fluid communicative connection elements. In the embodiment shown in FIG. 3, connector 203 may comprise male threads and is threaded into female threaded opening 214 to form a fluid communicative connection therebetween. Connector 203 also includes a poppet valve 204 located within a channel 205 in the connector 203. A poppet valve 204 is a valve consisting of a hole (not shown), a plug 206, and, optionally, a valve stem shaft 207 operatively engaged with said plug 206. Poppet valves 204 can be normally-open or normally-closed valves. In certain embodiments, and without limitation, the poppet valve 204 may comprise a Schrader valve or other kind of poppet valve. A Schrader valve is a normally-closed poppet valve wherein the plug 206 is connected to a valve stem 207 and wherein the plug 206 is held in a normally-closed position by a spring (not shown) that is adapted to exert a closure force on the plug 206. As used herein, unless otherwise noted, a poppet valve 204 is a Schrader valve. A poppet valve 204 can be opened by application of a force greater than the poppet valve closure force to the plug 206 to move the plug 206 out of its closed position and, thereby, to open the valve to permit fluid flow. In certain embodiments, the force to open the poppet valve 204 is applied to the valve stem 207 and, thereby, to the plug 206.

The temperature-sensitive fluid flow interruption device 100 may comprise a housing 120, a displacement member 140, a spring 160, and a retention cap 180. Some embodiments of the temperature-sensitive fluid flow interruption device 100 comprise optional components such as an O-ring 185 or other components. The temperature-sensitive fluid flow interruption device 100 is adapted for compatibility with fluid flow during operation in one temperature region and is adapted to interrupt fluid flow during operation in a second temperature region. Without limitation, adaptations to interrupt fluid flow during operation in a second temperature region may comprise movement, displacement, deformation, breakage, fracture, bending, melting, or other changes in a part, component, or sub-assembly of the temperature-sensitive fluid flow interruption device 100. In some embodiments, without limitation, adaptations to interrupt fluid flow during operation in a second temperature region comprise movement or displacement of one or more components of the temperature-sensitive fluid flow interruption device 100 away from a position necessary to maintain fluid flow. In some embodiments, during operation in a first temperature region, a component of the temperature-sensitive fluid flow interruption device 100 forms an interference with a poppet valve 204 displacing the poppet plug 206 to open the valve against the valve's spring, while during operation in a second temperature region the valve's spring displaces the component of the temperature-sensitive fluid flow interruption device 100 permitting the poppet plug 206 to close the valve. In some embodiments, without limitation, the temperature-sensitive fluid flow interruption device 100 is adapted for re-use after functioning to interrupt of fluid flow through adaptations to interrupt fluid flow during operation in a second temperature region comprising only changes in the position of components with respect to one another, such that resetting the temperature-sensitive fluid flow interruption device 100 to a position compatible with fluid flow is only a matter of moving the original components back to their original state.

Figures 6, 7:
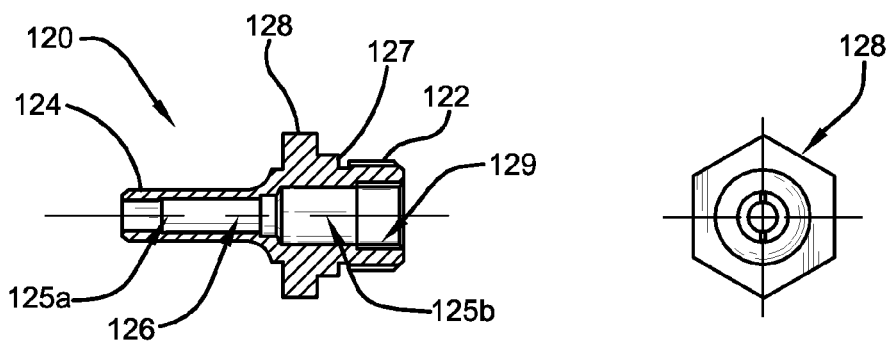
FIG. 6 is a front sectional view of one embodiment of a housing.
FIG. 7 is a top view of one embodiment of a housing.
Figure 8:
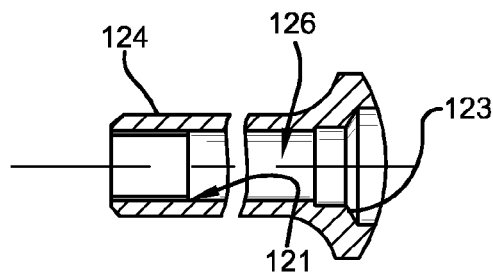
FIG. 8 is a detailed front sectional view of one embodiment of a housing showing the details of one region of the housing
Figures 9, 10:
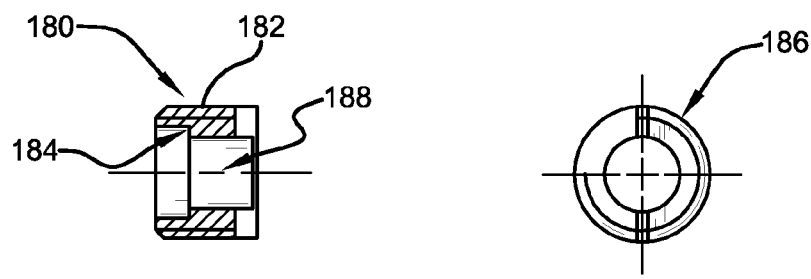
FIG. 9 is a front sectional view of one embodiment of a retention cap.
FIG. 10 is a top view of one embodiment of a retention cap.

The housing 120 may comprise a body. Without limitation, the body of the housing may be prismatic or irregular in shape. As used herein, prismatic may comprise both 1) a polyhedron with two polygonal faces lying in parallel planes and with the other faces parallelograms and 2) a cylinder. In general, the surfaces of a cylinder are the end surfaces and the curved surface between the end surfaces; the curved surface between the end surfaces will be referred to as the lateral surface. The housing 120 may comprise connection elements 122 adapted for connection with a pressure regulator 200. In certain embodiments, the connection elements 122 adapted for connection with a pressure regulator comprise male threads and are threaded into female-threaded opening 214 to form a fluid communicative connection therebetween. In certain embodiments, the housing may comprise an elongated structure 124. The housing 120 may comprise an elongated channel 126 therethrough. The elongated channel 126 may comprise a through hole. The cross-section of the elongated channel 126 may be circular, ovoid, polygonal or other shape and may vary in size, shape or other properties, along the length of the elongated channel 126. As shown in FIGS. 6-8, in certain embodiments, the elongated channel 126 may comprise a plurality of cavities. Without limitation, cavities 125*a* and 125*b* may differ in geometry, shape, and size. In certain embodiments, cavities 125*a* and 125*b* are prismatic. In certain embodiments, cavities 125*a* and 125*b* are both cylindrical and differ in diameter. In certain embodiments, without limitation, as shown in FIGS. 6-8, the elongated channel 126 may comprise axial facing interior surfaces 121 or surfaces with facings having an axial component 123. In certain embodiments, without limitation, as shown in FIGS. 6-8, axial facing interior surfaces 121 or surfaces with facings having an axial component 123 are positioned between cavities such as 125*a* and 125*b*.

In certain embodiments, the cross-sectional area of the elongated channel 126 may be sufficiently large to at least partially accommodate valve stem 207. In certain embodiments, the housing may comprise an abutment surface 127 adapted to contact against and/or form a seal with a facing surface (not shown) of pressure regulator 200. In certain embodiments, the housing may comprise tool interface surface 128 adapted to interface with a tool (not shown) during rotation, assembly, repair, refurbishment, installation, removal, or other operations performed with or upon the housing 120 or the temperature-sensitive fluid flow interruption device 100. In certain embodiments, the tool interface surface 128 may comprise at least part of a substantially regular polygonal prism adapted for use with a conventional wrench or socket (not shown). As shown in FIG. 7, in certain embodiments, tool interface surface 128 may comprise parts of a regular hexagonal prism. In certain embodiments, the tool interface surface 128 is adapted to resist engagement of certain tools. In certain embodiments, the tool interface surface 128 is adapted to resist tampering. In certain embodiments, the tool interface surface 128 is adapted for engagement with tools adapted for use with tamper-resistant fasteners or security fasteners. In certain embodiments, the tool interface surface 128 is adapted to substantially prevent or inhibit the use of tools not adapted for use with security fasteners. In certain embodiments, the tool interface surface 128 is pentagonal or triangular and is adapted for use with pentagonal or triangular security fastener tools. In certain embodiments, the elongated channel 126 may comprise a retention cap engagement region 129. A retention cap engagement region 129 may be adapted to removably engage a retention cap 180. In certain embodiments a retention cap engagement region 129 may comprise male threads, female threads, surfaces or holes to accept pins, keys, clamps, clips or other mechanical fasteners, or other adaptations to removably engage a retention cap 180. In certain embodiments a retention cap engagement region 129 is adapted to accept a press fitted retention cap 180.

The displacement member 140 may comprise an elongated element adapted for engagement with the elongated channel 126 of the housing 120 and adapted for engagement with poppet valve 204. The displacement member 140 may comprise a displacement member longitudinal axis 147, a valve engageable end 148, a second end 149, a flange 142, and a displacement member spring retention surface 144. The valve engageable end 148 is adapted for removable engagement with a poppet valve 204 or for removable engagement with a component of a poppet valve 204, such as, without limitation, a valve stem 207. The displacement member 140 may optionally comprise an O-ring retention geometry 146. In certain embodiments the displacement member 140 may comprise an pin, shaft, stick, prong, probe, spindle, arbor, bar, bolt, or other elongated member. In certain embodiments the displacement member 140 may comprise a polymer, metal, metal alloy, or combination thereof. In certain embodiments the displacement member 140 may comprise a eutectic alloy or a linear low density polyethylene (LLDPE). In certain embodiments the displacement member 140 may comprise materials that have material properties that are substantially affected by temperature. In certain embodiments the displacement member 140 may comprise materials that have material properties that change substantially as temperature changes between temperatures below a predetermined temperature and temperatures above a predetermined temperature. In certain embodiments the displacement member 140 may comprise materials that have material properties that change substantially as temperature changes between temperatures below a predetermined temperature and temperatures above a predetermined temperature; wherein said material properties comprise at least one of modulus of elasticity, yield strength, static coefficient of friction with respect to the surface material of the elongated channel 126, dynamic coefficient of friction with respect to the surface material of the elongated channel 126, coefficient of thermal expansion, compressive strength, tensile strength, and shear strength.

The spring 160 may comprise a part adapted to produce a restorative force in response to deformation of the part. Stiffness is the differential of restorative force with respect to displacement of one part or region of a part or member with respect to a second part or region of the part or member. All real materials and all of the components comprising the temperature-sensitive fluid flow interruption device 100 have some real and finite stiffness; they undergo some strain, have a stiffness, deflect, and produce a restorative force in response to application of a stress, while these strains, and deflections are sometimes small enough to be negligible, the characteristics of stiffness, strain, deflection, and restorative force as discussed with respect to springs will be generally applicable to any real material.

In certain embodiments, the spring 160 is elongated and may comprise a longitudinal axis, a first spring end 162 and a second spring end 164. In certain embodiments, the restorative force may be a non-linear function of displacement of the first spring end 162 with respect to the second spring end 164, a quadratic function of displacement of the first spring end 162 with respect to the second spring end 164, a linear function of displacement of the first spring end 162 with respect to the second spring end 164, or have some other relationship to displacement of the first spring end 162 with respect to the second spring end 164. In certain embodiments, the restorative force of the spring 160 is a function of displacement of the first spring end 162 with respect to the second spring end 164 and is also a function of the temperature of spring 160. In certain embodiments spring 160 may comprise a coil spring, a leaf spring, a compression spring, a tension spring, a cupped spring washer, an elastomer, or combinations thereof. Without limitation, in coil springs and leaf springs, the restorative force often a substantially linear function of displacement of the first spring end 162 with respect to the second spring end 164. In certain embodiments the spring 160 may comprise a polymer, metal, metal alloy, or combination thereof. In certain embodiments the spring 160 may comprise a eutectic alloy or a linear low density polyethylene (LLDPE). In certain embodiments the spring 160 may comprise materials that have material properties the are substantially affected by temperature. In certain embodiments the spring 160 may comprise materials that have material properties that change substantially as temperature changes between temperatures below a predetermined temperature and temperatures above a predetermined temperature. In certain embodiments the spring 160 may comprise materials that have material properties that change substantially as temperature changes between temperatures below a predetermined temperature and temperatures above a predetermined temperature; wherein said material properties comprise at least one of modulus of elasticity, yield strength, static coefficient of friction with respect to the surface material of the elongated channel 126, dynamic coefficient of friction with respect to the surface material of the elongated channel 126, coefficient of thermal expansion, compressive strength, tensile strength, and shear strength.

In certain embodiments, a retention cap 180 may comprise engagement elements 182 adapted for removable engagement with a retention cap engagement region 129 of housing 120. In certain embodiments, engagement elements 182 comprise male threads, female threads, or other adaptations to removably engage retention cap engagement region 129. In certain embodiments, a retention cap 180 may comprise a retention cap spring retention surface 184 adapted for engagement with a spring end of spring 160. In certain embodiments, a retention cap 180 may comprise a tool interface region 186 adapted for engagement with tool (not shown). In certain embodiments, a retention cap 180 is adapted to capture, or act as a barrier to, or substantially resist the passage of the displacement member flange 142. The tool interface region 186 may be engaged with a tool during rotation, assembly, repair, refurbishment, installation, removal, or other operations performed with or upon the tool interface region 186, the retention cap 180, the housing 120, or the temperature-sensitive fluid flow interruption device 100. In certain embodiments the tool interface region 186 is adapted to resist engagement of certain tools. In certain embodiments the tool interface region 186 is adapted to resist tampering. In certain embodiments the tool interface region 186 is adapted for engagement with tools adapted for use with tamper-resistant fasteners or security fasteners. In certain embodiments the tool interface region 186 is adapted to substantially prevent the use of tools not adapted for use with security fasteners. In certain embodiments the tool interface region 186 is adapted for use with tools adapted for use with security fasteners comprising, spanner fasteners, Phillips pin-head fasteners, socket pin-head fasteners, Torx® pin-head fasteners, Tri-wing® fasteners, or TP3® fasteners. In certain embodiments, the retention cap 180 is adapted to capture spring 160 within elongated channel 126 by acting as a removable barrier to removal of spring 160. In certain embodiments, the retention cap 180 may comprise a hole 188 adapted to permit axial insertion and passage therethrough of displacement member 140 or components of the displacement member 140.

In certain embodiments, the displacement member 140 is axially inserted, at least partially, into the elongated channel 126 of the housing 120. In certain embodiments, the displacement member 140 forms a press fit with the interior surface of the elongated channel 126. In certain embodiments in which the displacement member 140 is engaged with an O-ring, the O-ring has a press fit with respect to the displacement member 140 and the O-ring has a press fit with respect to the elongated channel 126. In certain embodiments, the forces involved in the press fit between two members may be sufficient to retain and thereby axially position the fitted members with respect to one another. In certain embodiments, the displacement member 140 forms a clearance fit with the interior surface of the elongated channel 126. Spring 160 may comprise a first spring end 162 operatively engageable with a displacement member spring retention surface 144 of the displacement member 140. Spring 160 also may comprise a second spring end 164. Second spring end 164 may be operatively engageable with a retention cap spring retention surface 184 of retention cap 180. The engagement elements 182 of retention cap 180 removable engage retention cap 180 with retention cap engagement region 129 of housing 120.

In certain embodiments, displacement member 140 may be axial located by axially locating flange 142 against an axial facing interior surfaces 121 or surfaces with facings having an axial component 123. Flange 142 may be located against an axial facing interior surfaces 121 or surfaces with facings having an axial component 123 by biasing the flange 142 against the surface or surfaces with forces from spring 160 or from force from the retention cap 180 exerted directly or indirectly upon the flange 142, or displacement member 140 or components thereof.

In certain embodiments, the engagement of the displacement member 140 with the elongated channel 126 is a function of temperature. In certain embodiments, the displacement member 140 occupies, at least partially, the elongated channel 126; at temperatures below a predetermined temperature, the fit between the displacement member 140 and the at least partially occupied elongated channel 126 is a press fit; at temperatures above a predetermined temperature, the fit between the displacement member 140 and the at least partially occupied elongated channel 126 is a clearance fit.

A press fit produces a substantially resilient engagement between the displacement member 140 and the elongated channel 126. Substantially resilient engagement produces a hard assembly of the displacement member 140 and the elongated channel 126; that is, the assembly is "hard" in the sense that large forces or stresses are required to produce small strains or displacements between at least one element of the displacement member 140 and at least one element of the elongated channel 126. Unless noted otherwise, as used herein, a hard assembly produces conditions that require forces greater than the poppet valve closure force in order to substantially move, strain or displace the valve engageable end 148 of the displacement member 140 with respect to the elongated channel 126; in such embodiments, a force greater than the poppet valve closure force applied to the housing, through the displacement member 140 engaged thereto, and to the poppet valve 204 engaged thereto will displace the plug 206 from its closed position and, thereby, open the valve to permit fluid flow while only inducing a very small displacement in the displacement member 140.

A clearance fit produces a substantially compliant engagement between the displacement member 140 and the elongated channel 126. Substantially compliant engagement produces a soft assembly of the displacement member 140 and the elongated channel 126; that is, the assembly is "soft" in that small forces or stresses are required to produce large strains or displacements between at least one element of the displacement member 140 and at least one element of the elongated channel 126. Unless noted otherwise, as used herein, a soft assembly produces conditions that require forces less than the poppet valve closure force in order to substantially move, strain or displace the valve engageable end 148 of the displacement member 140 with respect to the elongated channel 126; in such embodiments, a force equal to or greater than the poppet valve closure force applied to the housing, through the displacement member 140 engaged thereto, and to the poppet valve 204 engaged thereto will displace the displacement member 140 from its position within elongated channel 126 while leaving the plug 206 substantially unmoved from the closed position and leave the valve closed to fluid flow.

Figure 11:
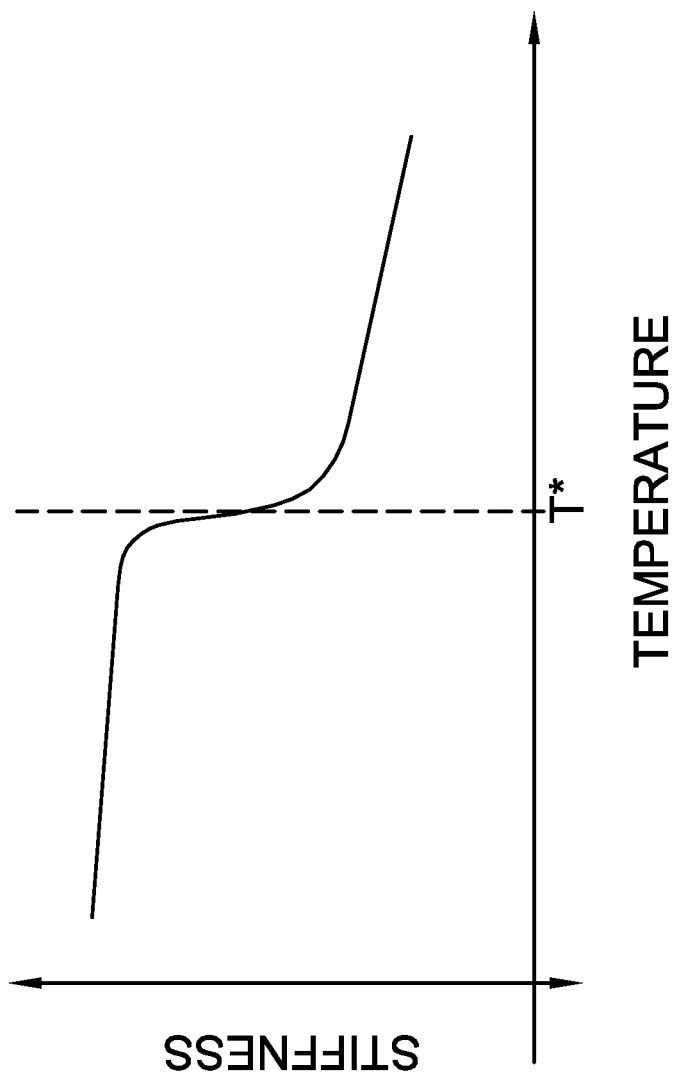
FIG. 11 shows a function that substantially approximates a step-wise function of stiffness with respect to temperature.

In certain embodiments, the performance of displacement member 140 is a function of temperature. In certain embodiments, the restorative force of the displacement member 140 is a function of displacement of the valve engageable end 148 with respect to other parts or regions of the displacement member 140 and is also a function of the temperature of displacement member 140. In certain embodiments, the stiffness of the displacement member 140 is substantially constant at a given temperature. In certain embodiments, at temperatures below a predetermined temperature, the displacement member 140 has a high stiffness. In certain embodiments, at temperatures above a predetermined temperature, the displacement member 140 has a low stiffness. In certain embodiments, the stiffness of the displacement member 140 is a substantially linear function of temperature. In certain embodiments, the stiffness of the displacement member 140 substantially approximates a step-wise function of temperature; that is the stiffness of the displacement member 140 changes dramatically over a short temperature range. For sake of illustration, and without limitation, a function that substantially approximates a step-wise function of stiffness with respect to temperature is illustrated in FIG. 11. FIG. 11 shows a function that substantially approximates a step-wise function of stiffness with respect to temperature in which there is a dramatic change in stiffness over a short temperature range near a temperature, In certain embodiments, the displacement member 140 engages the poppet valve 204 or an element engaged to the poppet valve 204 to the spring 160 and thereby, to the retaining cap 108 and, thereby to the housing 120, and thereby, to the elongated channel 126. In certain embodiments, a high displacement member 140 stiffness produces a hard assembly of parts and components between the displacement member 140

In certain embodiments, the performance of spring 160 is a function of temperature. In certain embodiments, the restorative force of the spring 160 is a function of displacement of the first spring end 162 with respect to the second spring end 164 and is also a function of the temperature of spring 160. In certain embodiments, the stiffness of the spring 160 is substantially constant at a given temperature. At temperatures below a predetermined temperature, the spring 160 has a high stiffness. At temperatures above a predetermined temperature, the spring 160 has a low stiffness. In certain embodiments, the stiffness of the spring 160 is a substantially linear function of temperature. In certain embodiments, the stiffness of the spring 160 substantially approximates a step-wise function of temperature; that is the stiffness of the spring 160 changes dramatically over a short temperature range. For sake of illustration, and without limitation, a function that substantially approximates a step-wise function of stiffness with respect to temperature is illustrated in FIG. 11.

In certain embodiments, the spring 160 engages the displacement member 140 to the retaining cap 108 and, thereby to the housing 120, and thereby, to the elongated channel 126. A high spring stiffness produces a hard assembly of the spring 160 and displacement member 140; that is, the assembly is "hard" in that large forces or stresses are required to produce small strains or displacements between at least one element of the displacement member 140 and at least one element of the elongated channel 126.

Device temperatures may change after assembly. Accordingly, in some circumstances, the temperature-sensitive fluid flow interruption device 100 may be assembled with gas bottle 202 at a temperatures below the predetermined temperature and the assembly may subsequently attain a temperature above the predetermined temperature. Similarly, in some circumstances, the temperature-sensitive fluid flow interruption device 100 may be assembled with gas bottle 202 at a temperatures above the predetermined temperature and the assembly may subsequently attain a temperature below the predetermined temperature. In either case, the functionality of the assembly at the time of assembly may differ from the functionality of the assembly once its temperature changes.

In some circumstances a temperature-sensitive fluid flow interruption device 100 that performs as a hard assembly is connected to a gas bottle 202 comprising a normally-closed poppet valve 204 at a temperature below the predetermined temperature in a manner to permit fluid flow. Such assembly will subject the poppet valve 204 and the displacement member 140 to force greater than the poppet valve closure force and will displace the plug 206 from its closed position in order to open the valve to permit fluid flow. If the connected temperature-sensitive fluid flow interruption device 100 subsequently attains a temperature above the predetermined temperature, the temperature-sensitive fluid flow interruption device 100 will cease functioning as a hard assembly and will begin functioning as a soft assembly; consequently, the force between the poppet valve 204 and the displacement member 140 will suffice to displace the displacement member 140 from its position within elongated channel 126, sliding displacement member 140 further into elongated channel 126, and allowing the poppet valve closure force to return the plug 206 to the closed position and to close the valve to fluid flow.

In some circumstances a temperature-sensitive fluid flow interruption device 100 that performs as a soft assembly is connected to a gas bottle 202 comprising a normally-closed poppet valve 204 at a temperature above the predetermined temperature. Such assembly cannot be relied upon to open the valve in a manner that is non-transient because the soft assembly state of the temperature-sensitive fluid flow interruption device 100 will cause the internal forces of assembly to displace the displacement member 140 from its position within elongated channel 126 and allow closure of the poppet valve 204 by closure forces either immediately or very shortly after assembly. If the connected temperature-sensitive fluid flow interruption device 100 subsequently attains a temperature below the predetermined temperature, the temperature-sensitive fluid flow interruption device 100 will cease functioning as a soft assembly and will begin functioning as a hard assembly; however, the displaced displacement member 140 will not spontaneously return to its pre-displacement position; it will stay in the valve-closed position. Consequently, the force between the poppet valve 204 and the displacement member 140 will not be sufficient to open the valve to fluid flow.

The temperature of the temperature-sensitive fluid flow interruption device 100 may change or fluctuate. The temperature-sensitive fluid flow interruption device 100 may attain temperatures above the predetermined temperature for many reasons. Without limitation, the temperature-sensitive fluid flow interruption device 100 may attain temperatures above the predetermined temperature due to elevation of environmental temperatures due to nearby fire, flames, or combustion. In certain embodiments, the predetermined temperature is similar to temperatures attained during combustion in air at one atmosphere of propane, propene, MAPP gas, methylacetylene-propadiene, natural gas, methane, ethane, butane, liquid petroleum gas, hydrogen, HCNG, town gas, syngas, wood gas, or mixtures thereof. In certain embodiments, the predetermined temperature is similar to the maximum safe storage temperature of the lower of the bottle or for the fluid within the bottle. In certain embodiments, the predetermined temperature is between 136 degrees Fahrenheit and 940 degrees Fahrenheit.

In the embodiment illustrated in FIG. 2 the temperature-sensitive fluid flow interruption device 100 is engaged with a pressure regulator 200. Pressure regulator 200 may comprise an opening 216 that is aligned for engagement with the connector 203 of gas bottle 202. When engaged, the engagement of pressure regulator 200 with gas bottle 202 engages the temperature-sensitive fluid flow interruption device 100 with the poppet valve 204. In FIG. 2, the temperature-sensitive fluid flow interruption device 100 is shown in a state that, if the temperature of the device is below the predetermined temperature, will open the poppet valve 204 if engaged therewith; the displacement member 140 is shown extending from the housing 120 such that engagement with poppet valve 204 will depress the valve stem 207, move the plug 206 out of its closed position and, thereby, to open the valve to permit fluid flow.

In the embodiment illustrated in FIG. 3 the temperature-sensitive fluid flow interruption device 100 is engaged with a pressure regulator 200. Pressure regulator 200 may comprise an opening 216 that is engaged with the connector 203 of gas bottle 202. The engagement of pressure regulator 200 with gas bottle 202 engages the temperature-sensitive fluid flow interruption device 100 with the poppet valve 204. As shown in detail in FIG. 4, the temperature-sensitive fluid flow interruption device 100 is in its flow interruption state; the displacement member 140 is shown recessed into the housing 120 such that engagement with poppet valve 204 will not depress the valve stem 207, will not move the plug 206 out of its closed position and, will not open the valve to permit flow.

While the temperature-sensitive fluid flow interruption device 100 has been described above in connection with the certain embodiments, it is to be understood that other embodiments may be used or modifications and additions may be made to the described embodiments for performing the same function of the temperature-sensitive fluid flow interruption device 100 without deviating therefrom. Further, the temperature-sensitive fluid flow interruption device 100 may include embodiments disclosed but not described in exacting detail. Further, all embodiments disclosed are not necessarily in the alternative, as various embodiments may be combined to provide the desired characteristics. Variations can be made by one having ordinary skill in the art without departing from the spirit and scope of the wall mount system. Therefore, the temperature-sensitive fluid flow interruption device 100 should not be limited to any single embodiment, but rather construed in breadth and scope in accordance with the recitation of the attached claims.

What is claimed is:

1. A temperature-sensitive fluid flow interruption device adapted for use in operational connection with a Schrader valve, said Schrader valve operationally connected to a propane bottle, the temperature sensitive fluid flow interruption device being adapted for re-use after functioning to interrupt of fluid flow, the temperature sensitive fluid flow interruption device comprising:

a housing comprising
   an elongated substantially cylindrical body,
   connection elements comprising male threads operative connected to the exterior of said body and adapted for engagement with a regulator
   an elongated first channel through said body, said first channel comprising
     a longitudinal axis,
     a first substantially cylindrical cavity of a first diameter,
     a second substantially cylindrical cavity of a second diameter,
       wherein said second diameter is greater than said first diameter, and
       wherein said second substantially cylindrical cavity further comprises a retention cap engagement region comprising female engagement threads,
     a surface having a facing having an axial component between said first substantially cylindrical cavity and said second substantially cylindrical cavity,
   an abutment surface adapted for contact with a facing surface of the regulator, and a tool interface surface;
an elongated displacement member at least partially positioned within said elongated first channel, said elongated displacement member comprising
   a longitudinal axis,
   a elongated substantially cylindrical body, comprising linear low density polyethylene, a valve stem engageable end adapted for engagement with the valve stem,
a second end opposite said valve stem engageable end, and
an O-ring retention geometry
a flange engaged with the lateral surface of said elongated substantially cylindrical body, said flange comprising a first retention surface having a facing having an axial component,
wherein said elongated displacement member is engaged with the elongated first channel in a manner determined by the temperature of the temperature-sensitive fluid flow interruption device with respect to a predetermined temperature,
when the temperature of the temperature-sensitive fluid flow interruption device is below the predetermined temperature, the displacement member is engaged with the elongated first channel in a manner adapted to transmit forces greater than the closure force without substantial displacement of the displacement member with respect to the elongated first channel, and when the temperature of the temperature-sensitive fluid flow interruption device is above the predetermined temperature, the displacement member is engaged with the elongated first channel in a manner adapted to permit substantial displacement of the displacement member with respect to the elongated first channel in response to forces greater than the closure force;
a substantially cylindrical retention cap,
comprising male threads engaged with the lateral surface of said retention cap, being threadedly engaged with said retention cap engagement region,
comprising a retention cap spring retention surface,
comprising a tool interface region adapted for use with tools adapted for use with security fasteners, and
comprising a hole adapted to permit axial insertion and passage therethrough of said second end of elongated displacement member;
a compression coil spring, said spring being
removably and operatively engaged with said first retention surface, and
removably and operatively engaged with said retention cap spring retention surface; and
an O-ring.

2. The temperature-sensitive fluid flow interruption device of claim 1, wherein said tool interface region,
is adapted to resist tampering; and
is adapted for use by direct engagement with a tool adapted for use with tamper-resistant fasteners or security fasteners.

3. The temperature-sensitive fluid flow interruption device of claim 1, wherein said tool interface surface of said housing
is adapted to resist tampering; and
is adapted for use by direct engagement with a tool adapted for use with tamper-resistant fasteners or security fasteners.

4. The temperature-sensitive fluid flow interruption device of claim 3, wherein said tool interface region,
is adapted to resist tampering; and
is adapted for use by direct engagement with a tool adapted for use with tamper-resistant fasteners or security fasteners.

5. The temperature-sensitive fluid flow device of claim 4, wherein moving one or more components of the temperature-sensitive fluid flow interruption device is sufficient to reset temperature-sensitive fluid flow interruption device to hold an associated Schrader valve open.

6. The temperature-sensitive fluid flow device of claim 5, wherein the predetermined temperature is between 200 degrees Fahrenheit and 300 degrees Fahrenheit.

7. A temperature-sensitive fluid flow device comprising:
a housing comprising
an elongated first channel, and
a retention cap engagement region;
a retention cap removably engaged with said retention cap engagement region, said retention cap
comprising a retention cap spring retention surface, and
comprising a tool interface region,
said tool interface region being adapted for use by direct engagement with a tool,
said tool interface region is adapted to resist tampering, and
said tool is adapted for use with tamper-resistant fasteners or security fasteners
an elongated displacement member which comprises an elongated body comprising a first spring retention surface, said elongated member being engaged with said elongated first channel and engageable with an associated poppet of an associated poppet valve in such a way that,
when the temperature of the housing is below a predetermined temperature, the fluid flow device holds the associated poppet valve open, and
when the temperature of the housing is at or above the predetermined temperature, the fluid flow device does not hold the associated poppet valve open;
a spring comprising
a first spring end engaged with said first spring retention surface; and
a second spring end engaged with the said retention cap spring retention surface; and
wherein,
a) the elongated displacement member is engaged with said elongated first channel in a manner such that the fit condition there between is a function of temperature such that,
when the temperature of the housing is below the predetermined temperature, the elongated displacement member is press fit engaged with the elongated first channel, and when the temperature of the housing is at or above the predetermined temperature, the elongated displacement member is clearance fit engaged with the elongated first channel, or b) moving one or more components of the temperature-sensitive fluid flow device is sufficient to reset the fluid flow device to hold the associated poppet valve open.

8. The temperature-sensitive fluid flow device of claim 7 wherein said housing comprises a tool interface surface adapted for use by direct engagement with a tool.

9. The temperature-sensitive fluid flow device of claim 8, wherein
said retention cap comprises male threads;
said retention cap engagement region comprises female threads adapted to threadedly engage
said male threads of said retention cap; and
said retention cap is removably engaged with said retention cap engagement region by threaded engagement of said male threads of said retention cap with said female threads of said retention cap engagement region.

10. The temperature-sensitive fluid flow device of claim 9, wherein the elongated displacement member is engaged with said elongated first channel in a manner such that the fit condition therebetween is a function of temperature such that, when the temperature of the housing is below a predetermined temperature, the elongated displacement member is press fit engaged with the elongated first channel; and when the temperature of the housing is at or above the predetermined temperature, the elongated displacement member is clearance fit engaged with the elongated first channel.

11. The temperature-sensitive fluid flow device of claim 9, wherein moving one or more components of the temperature-sensitive fluid flow device is sufficient to reset the fluid flow device to hold the associated poppet valve open.

12. The temperature-sensitive fluid flow device of claim 11 wherein, said housing comprises a connection element adapted for engagement with a regulator.

13. The temperature-sensitive fluid flow device of claim 12, wherein the predetermined temperature is between 136 degrees Fahrenheit and 940 degrees Fahrenheit.

14. A temperature-sensitive fluid flow device comprising:
a housing comprising
an elongated first channel, and
a retention cap engagement region comprising female threads
a tool interface surface adapted for use by direct engagement with a tool
a connection element adapted for engagement with a regulator;
a retention cap removably engaged with said retention cap engagement region, said retention cap
comprising a retention cap spring retention surface, and
comprising a tool interface region,
said tool interface region being adapted for use by direct engagement with a tool,
said tool interface region is adapted to resist tampering, and
said tool is adapted for use with tamper-resistant fasteners or security fasteners,
comprising male threads adapted to threadedly engage said female threads of said retention cap engagement region, and
being removably engaged with said retention cap engagement region by threaded engagement of said male threads of said retention cap with said female threads of said retention cap engagement region;
an elongated displacement member which comprises an elongated body comprising a first spring retention surface, said elongated displacement member being engaged with said elongated first channel and engageable with an associated poppet of an associated poppet valve in such a way that,
when the temperature of the housing is below a predetermined temperature, the fluid flow device holds the associated poppet valve open, and
when the temperature of the housing is at or above the predetermined temperature, the fluid flow device does not hold the associated poppet valve open;
a spring comprising
a first spring end engaged with said first spring retention surface,
a second spring end engaged with said retention cap spring retention surface; and
wherein,
a) the elongated displacement member is engaged with said elongated first channel in a manner such that the fit condition therebetween is a function of temperature such that,
when the temperature of the housing is below the predetermined temperature, the elongated displacement member is press fit engaged with the elongated first channel, and
when the temperature of the housing is at or above the predetermined temperature, the elongated displacement member is clearance fit engaged with the elongated first channel and
b) moving one or more components of the temperature-sensitive fluid flow device is sufficient to reset the fluid flow device to hold the associated poppet valve open, and
c) the predetermined temperature is between 200 degrees Fahrenheit and 300 degrees Fahrenheit.

* * * * *